US006834395B2

(12) United States Patent
Fuentes (10) Patent No.: US 6,834,395 B2
(45) Date of Patent: Dec. 28, 2004

(54) HIGH VISIBILITY SAFETY GARMENT (76) Inventor: Ricardo Indalecio Fuentes, 64 Stormville Rd., Hopewell Junction, NY (US) 12533

( * ) Notice: Subject to any disclaimer, the term of this patent is extended or adjusted under 35 U.S.C. 154(b) by 0 days.

(21) Appl. No.: 10/437,637

(22) Filed: May 14, 2003

(65) Prior Publication Data

US 2003/0213045 A1 Nov. 20, 2003

Related U.S. Application Data (60) Provisional application No. 60/380,617, filed on May 15, 2002.

(51) Int. Cl.[7] ................................................ A41D 1/04
(52) U.S. Cl. ............................................. 2/69; 362/103
(58) Field of Search ............................... 2/102, 69, 94, 2/108, 93; 362/103, 108, 84, 31, 252

(56) References Cited

U.S. PATENT DOCUMENTS

| 3,561,394 | A | * | 2/1971 | Pickens ..................... 116/35 R |
| 4,709,307 | A | * | 11/1987 | Branom ...................... 362/103 |
| 5,070,436 | A | * | 12/1991 | Alexander et al. .......... 362/108 |
| 5,249,106 | A | * | 9/1993 | Barnes et al. ............... 362/108 |
| 5,690,411 | A | * | 11/1997 | Jackman ..................... 362/103 |
| 6,085,698 | A | * | 7/2000 | Klein ......................... 119/859 |
| 6,324,053 | B1 | * | 11/2001 | Kamijo ....................... 361/683 |
| 6,538,341 | B1 | * | 3/2003 | Lang ............................ 307/18 |
| 6,558,016 | B1 | * | 5/2003 | Restauro .................... 362/103 |

* cited by examiner

Primary Examiner—Tejash Patel
(74) Attorney, Agent, or Firm—Aziz M. Ahsan; Ahsan & Associates (57) ABSTRACT The present invention relates generally to high visibility garment, and more specifically to high visibility safety garment. Method, apparatus, device and an article of clothing implementing the invention are also disclosed.

19 Claims, 5 Drawing Sheets

FIG. 6

HIGH VISIBILITY SAFETY GARMENT

This application claims the benefit of provisional application No. 60/380,617 filed on May 15, 2002.

FIELD OF THE INVENTION

The present invention relates generally to high visibility garment, and more specifically to high visibility safety garment. Method, apparatus, device and an article of clothing implementing the invention are also disclosed.

BACKGROUND INFORMATION

In general the prior art depends upon individuals or machine mounted device to display the intentions to those in the surrounding area. For example, an indicator on a vehicle or a machine-mounted signal is used in the art to inform the intention to those in the surrounding areas. Actions such as approaching, turning, and braking, among others are also similar examples of such indications. Similarly, vehicles and other equipment or machinery, also may rely on sounds and visual signals to alert individuals of potential risks. As the large number of accidents, many resulting in fatalities, attests, these means known in the art are often not enough.

For example, in the particular case of a motorcycle rider, vehicle-mounted signals are often small and rather difficult to see by the surrounding motorists. Given the increased vulnerability of a rider in a small vehicle, such as, a motorcycle, this is a serious drawback.

Another example of deficient awareness is provided by the environment on construction sites or sites where heavy machinery is in use. Workers have to rely on makeshift marks, signals, sounds or lights, which vary largely from place to place, to inform the individual of any impending risk. The lack of awareness of such risk can result in accidents, often with fatal consequences.

There are also a great variety of situations when an individual, alone or as a member of a "team," would benefit from being able to broadcast or communicate his actions or intentions, as well as being able to receive input from his environment or other team members, with minimal or non-existent active participation by the individual. There is a lack of devices that would accomplish such task.

Thus the present invention aims to alleviate these drawbacks by providing for example a user-worn signaling and I/O device with a multiplicity of signals coming into it or going out of it, in a multiplicity of forms, such as light, visual patterns, sounds, vibration, among others, while accepting input from transponders, RF or wireless devices, or other various devices intended to warn or inform the wearer of specific conditions or provide spatial awareness in order to improve the user's ability to safely cope with its environment.

PURPOSES AND SUMMARY OF THE INVENTION

The invention is a novel high visibility garment.

Therefore, one purpose of this invention is to provide a high visibility garment.

Another purpose of this invention is to provide a high visibility garment that can be worn by at least one user, and where that garment has means to allow communication between the user wearing the garment and another entity.

Therefore, one aspect of this invention, is a flexible pad comprising a plurality of indicator.

Another aspect of this invention is a high visibility garment, comprising, at least one indicator secured to said garment and which indicator can be activated upon demand.

Yet another aspect of this invention is an article of clothing comprising at least one high visibility indicator wherein the indicator is securely attached to the garment.

BRIEF DESCRIPTION OF THE DRAWINGS

The features of the invention believed to be novel and the elements characteristic of the invention are set forth with particularity in the appended claims. The drawings are for illustration purposes only and are not drawn to scale. Furthermore, like numbers represent like features in the drawings. The invention itself, both as to organization and method of operation may best be understood by reference to the detailed description which follows taken in conjunction with the accompanying drawings in which:

DETAILED DESCRIPTION

This invention relates to garment or garment add-on worn by an individual to indicate or broadcast the wearer's intentions and/or increase his/her visibility, and/or provide information to him/her about his/her surroundings by signaling by turning on a pattern or patterns of light or other visible or non-visible form of energy, such as, for example, Infrared (IR), with or without concurrent sound or other audible, mechanical or other sensory signals, the lights, pattern or signaling hardware imbedded, attached, or applied onto the garment, or worn as a stand alone device.

One purpose of such garment or device is to increase the wearer's safety by increasing his visibility and making his presence, position and intentions visible and/or perceptible by others.

This invention is not limited to a specific area or application, but to the broader field of making the wearer's presence more noticeable, safety being only one of the intents. Fashion and plain self-expression, as well as other forms of communications via the the garment are also contemplated.

Another purpose of this invention, which can be implemented in addition to or instead of, or in any combination of features among those described above, is to assist in making the wearer of the garment or device aware of its surroundings. The garment or device can also react to the environment which can be done via active or passive methods, helping to make the wearer aware of actions or presences in his surroundings.

The features of this invention are also contemplated to be useful, for example, in an industrial or construction site, where moving objects and vehicles can endanger an individual who fails to react to impending risks. The garment or device can indicate such presences or risks to the individual via sounds, vibration, lights, or combinations of these and other sensory signals.

Other areas of application of this invention include, but are not limited to, law enforcement, where the garment or device can de used in conjunctions with ballistic or other garments, the military, aviation/airports, and construction crews, among others.

Riding a motorcycle or other vehicles, as well as industrial, law enforcement or military applications are only but a few examples of uses of this invention.

One application of this invention is a garment that lights up when a wearer makes a specific move, for example, a left or right arrow type indicator lights up when the wearer who is riding a motorcycle, intends to make the corresponding turn, as well as lighting up a stop signal or sign when the wearer presses the motorcycle's brakes.

Another example of this invention is when the garment or device makes the wearer aware of the presence of an impeding risk, such as, a vehicle backing towards him/her.

Yet another example of this invention is when the garment or device makes the wearer aware of his location with respect to others or other vehicles, structures, potential sources of injury or death, to name a few.

Still another example of this invention is when the garment or device makes the wearer aware of his/her location within a prescribed volume or area via signals received from a "position device," such as, from a global positioning system (GPS), or other source of the positional information.

Another example of this invention is that when the inventive garment communicates with other similar or compatibly enabled devices, vehicles or garments to either communicate or be part of a "network" for whatever purposes the wearer intends.

Figure 1:
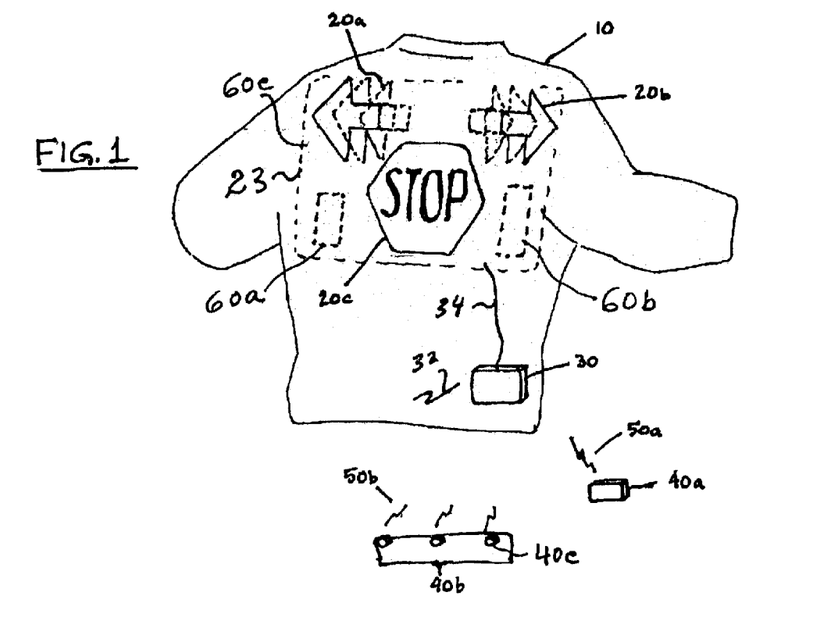
FIG. 1 illustrates a first embodiment of the present invention.

FIG. 1 illustrates a first embodiment of the present invention. The first embodiment comprises, a garment 10, for example, a jacket or vest or a stand alone device worn by or on a motorcycle or vehicle rider with at least one indicator or feature 20a, 20b, 20c, etc., such as, for example, an embedded or overlaid pattern 20a, 20b and 20c in the back and/or front, and/or sleeves, and/or in any other appropriate places, and/or other means of sensory input/output (I/O), a driving and power circuitry or hardware 30, for the pattern or associated hardware and I/O devices, associated circuitry or hardware 40a and 40b, a communication means between a vehicle and the driving circuitry or hardware 40a, 40b, 50a, 50b. The indicators or features 20a, 20b, 20c, could be weaved into the garment 10, or they could be secured to a pad 23, such as, a flexible illuminated display pad 23. The pad 23 could have at least one means for securing the pad 23 to the garment 10. The securing means, not shown, could consist of self-adhesive glue, glue, stitching means, buttons, peelable material, bonding material, epoxy-type material, magnet or magnet-type material, hook and loop, for example, Velcro, to name a few. For the purposes of illustration the garment 10 has been shown as a vest or jacket, however the garment could easily comprise an overcoat, a coat, a shirt, a skirt, a pant, an undergarment, an overgarment, a bag, a belt, to name a few. Similarly, for the ease of understanding other related hardware and software required for the invention to operate in the desired manner has not been illustrated. Hardware 40a and 40b could be a transmitter or receiver, preferably with wireless transmission means 50a and 50b, respectively. Optionally, hardware 30 can be transmitter and/or receiver with preferably a wireless means 32. Hardware 30 is electrically connected to the indicators 20a and/or 20b and/or 20c by means of at least one electrical connection 34. Hardware 40b has at least one switch 40c. Hardware 40a could also have one or more switch (not shown). Switch 40c could perform different functions, such as, for example, off/on, frequency transmission selection, signal transmission, transmission intensity selection, monitoring signal strength, to name a few.

In one embodiment the pattern may consist of a plurality of indicators 20a, 20, 20c, to name a few. For example, indicator 20a, could be one or more left-turn indicator 20a, for example, one or more left arrow, among many single or multiple patterns or combinations or sequences of patterns possible; the pattern, patterns, or sequences of patterns, from now on, referred to only as "pattern" or "patterns." Indicator 20b, for example could be one or more right-turn indicator 20b, for example, one or more right arrow. Indicator 20c, message sign, such as a stop indicator 20c, for example, a stop sign, among many single or multiple patterns contemplated and from now on referred to as "stop pattern".

The flexible illuminated display pad 23, of this invention can have a variety of purposes and functions. Among others, it can display an illuminated (visible or IR) pattern on a single or multiple locations on the wearer's body, it can interface with internal conductive patches in contact with the wearer's skin to monitor biological signals, it can receive positioning signals (i.e. GPS) and transmit/receive RF signals and data for a variety of communications, control, signaling and networking purposes. It can also contain a variety of sensors and devices, such as magnetic, RF, optical, thermal, laser radiation, EMF, sound, ultrasonic ranging, inertial, among others, with the purpose of enhancing the wearer's safety, visibility, survivability, communication abilities, interfacing, command and control functions, to name a few. The pad contemplates, among a variety of possible schemes, preferably three main control "modules." These modules are intended to address and accommodate the different elements required by the incorporation of the different functions of the pad and hardware as discussed elsewhere in the specification. The particular hardware and software incorporated with this invention will vary depending on the application. Different modules with different functionality and components are also contemplated by this invention.

One type of an on-board module, such as, hardware or module, 60a and/or 60b and/or 60c, could comprise elements and devices that are integrated onto the flexible circuit substrate, such as, for example, LEDs, electronic driving components, batteries, power conditioning, antennae, to name a few possible devices and features. In the example of an embodiment of a motorcycle rider safety pad, it may contain LEDs, flexible circuits, spacer mask, patterned overlay, environmental seal, wiring and other necessary ancillary hardware.

Another example of a module could be an on-body module, such as, for example, hardware or module 30. This on-body module 30, could be separate from the pad, but attached to it via at least one wire harness or in some other suitable form, and worn by the user of the pad. It may contain a variety of electronic and communication devices, such as, but not limited to, GPS receiver, RF transceiver, RF wireless link, wireless networking hardware, power supply, batteries, to name a few devices and features. It may also have the capability to interface with the vehicle, when appropriate, for power and signaling requirements, among other reasons. In the example of an embodiment of the motorcycle rider's safety pad, the on-body module may contain an RF link, a decoder, power supply (i.e. batteries), driving electronics for the pad's light emitting devices, to name a few, as well as related ancillary hardware.

Another type of a module could be a remote module, such as, hardware or module 40*a* and 40*b*. This type of a module preferably interacts with the pad via a wireless, IR, RF, wired, to name a few, or other suitable link, but is not worn by the user. This type of module can be located remotely as appropriate or as is the case of the motorcycle rider's safety pad on a vehicle and interface with its systems to relay useful signals to the pad and its on-body controller. In this particular embodiment the remote module may contain an RF wireless link, an encoder and appropriate power conditioning, to name a few, and other appropriate ancillary hardware. The remote module preferably has means to signal the on-body module to turn on and off, for example, at an appropriate turn and stop signals. It is obvious that the components in each module can be interchangeably placed in different modules as the application dictates, and thus any and all combinations are contemplated and are also a subject of this invention.

Figures 2A, 2B:
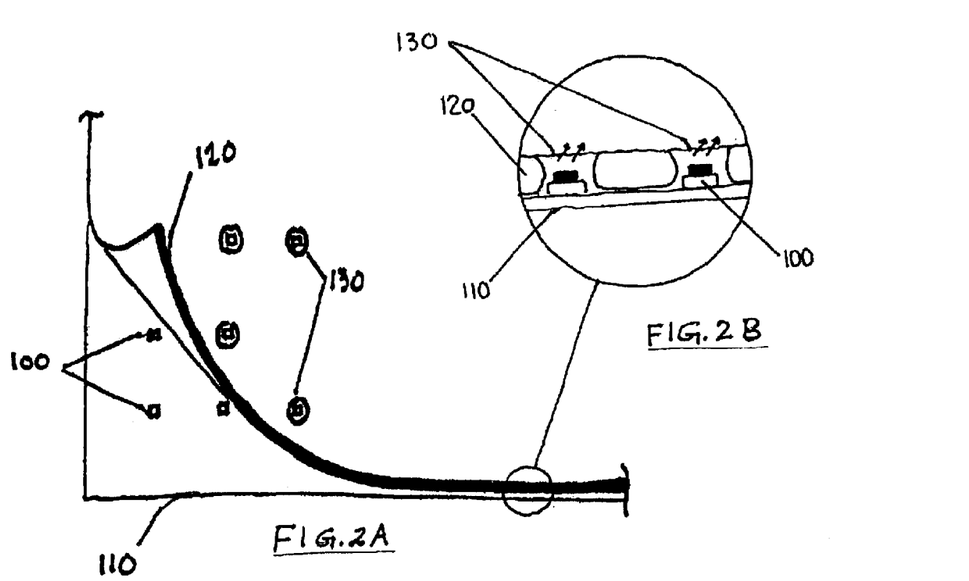
FIG. 2A illustrates another embodiment of the present invention.
FIG. 2B illustrates an enlarged view of the embodiment illustrated in FIG. 2A.

FIG. 2A illustrates another embodiment of the present invention, where a flexible substrate 110, has a plurality of indicators 100. The indicators 100 could form a random or a recognizable pattern. The substrate 110 could be a standalone substrate, an adhesive substrate, a substrate that is integrate able with a garment or a wearable item, a substrate that is part of a garment or a wearable item, to name a few.

Optionally, a layer or pattern 120, could also be attached or integrated with the flexible substrate 110. It is preferred that the layer or pattern 120, is cosmetically appealing. However, the layer or pattern 120 could be transparent, translucent or opaque. The optional layer or pattern 120 could optionally have a plurality of holes or openings or areas 130, to expose any item or layer that may be under the layer or pattern 120, such as the flexible substrate 110, one or more indicators 100, to name a few.

The indicators 20*a*, 20*b*, 20*c* could be made of individual elements that can reflect, transmit or emit light, for better visibility of the pattern. For example, a plurality of light emitting diodes (LED) 100, as more fully discussed with reference to FIG. 2. (LEDs), optical fibers, or individual reflective elements or "pixels." In the preferred embodiment, the pattern is created by using LEDs 100 mounted in a flexible substrate 110 (similar to a those used in the manufacture of flexible printed circuits) and overlaid by a cosmetically appealing layer or pattern 120. Such layer can be an embroidered "patch" 120 with appropriate holes 130 made through it such that the underlying LEDs show through, or a colored or clear material with or without forming a pattern (i.e. text, logos, icons, among others). Alternatively, the pattern can be created by embedded plastic "light pipes" made with optical fibers. In this case, the application of an overlay can also be contemplated herein. The pattern or patterns can be made sensitive to light in its environment to enhance its visibility and usefulness. In such, or any other contemplated case, the hardware and software described herein will work in concert with the feature to incorporate it effectively into the garment and its overall functionality. Alternatively, the pattern can be made of a matrix or array of the visual elements 100 (LED's, optical fibers, among others) and be randomly addressable so arbitrary patterns (e.g. graphics, text, corporate logos, among others) can be thus displayed in what would amount to a personal, portable, flexible, wearable, display device.

FIG. 2B illustrates an enlarged view of the embodiment illustrated in FIG. 2A. FIG. 2B shows a base flexible circuit layer 110, onto which the light emitting elements 100 are affixed. It also shows a "patch" type of overlay 120 with holes or openings 130 which have been cut out appropriately to allow light from the light emitting elements 100 to pass through. The overlay may contain a design to complement and enhance the presence of the light emitting elements 100. For example, the overlay or patch 120 may contain an embroidered image of fireworks, with holes 130 cut-out in appropriate places to allow light from the light emitting elements 100 to pass through, thus enhancing and animating the image. Animation may or may not be included as part of the display. Other patterns and combination are obvious and also the subject of this invention. For example, the overlay or patch may contain an embroidered image of fireworks and it allows light from the light emitting elements to pass through, thus enhancing and animating the image. Animation may or not be included as part of the display. Other patterns and combination are obvious and also the subject of this invention.

Figure 3A:
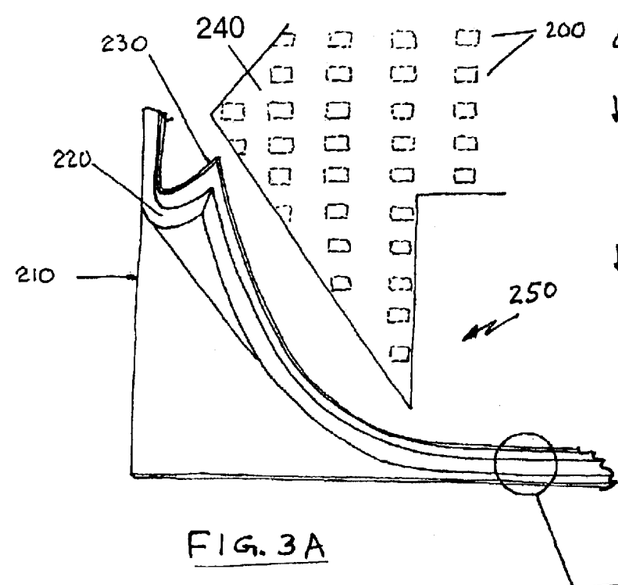
FIG. 3A illustrates another embodiment of the present invention.

FIG. 3A illustrates another embodiment of the present invention. Depicted schematically in FIG. 3A is a layered structure of a preferred embodiment for a pad structure 250 which is also a subject of this invention. The pad 250 preferably is composed of a base flexible circuit 210, to which is affixed and connected are the light emitting elements 200, such as, LEDs 200, light pipe 200, to name a few, a separator layer 220, such as, a foam or any other suitable separator material 220. The separator 220 is intended to provide a gap between the light emitting elements 200 and the overlay 230. The overlay 230, could be a clear/colored transparent type overlay onto which a pattern, design, image or any type of design, pattern or layout can be imprinted, inlaid or placed by any other suitable means. For the purposes of illustration a partial left arrow 240 can be seen in FIG. 3A. For example, the partial arrow 240 is amber in color on a black background, and underneath the arrow pattern 240, the light emitting elements 200, can be placed.

Figure 3B:
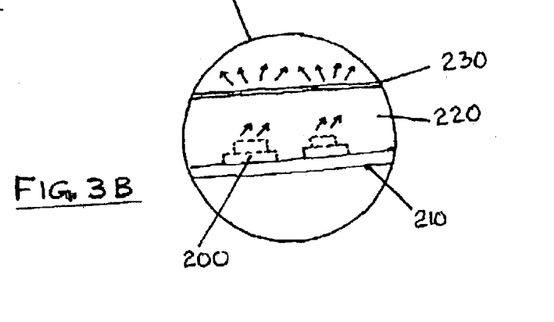
FIG. 3B illustrates an enlarged view of the embodiment illustrated in FIG. 3A.

FIG. 3B illustrates an enlarged view of the embodiment illustrated in FIG. 3A. FIG. 3B shows a base flexible circuit layer 210, onto which the light emitting elements 200 are affixed. It also shows a clear or colored transparent type of an overlay 230 and/or a separator 220, which preferably allows light from the light emitting elements 200 to pass through. The overlay may contain a design to complement and enhance the presence of the light emitting elements 200.

Figure 3C:
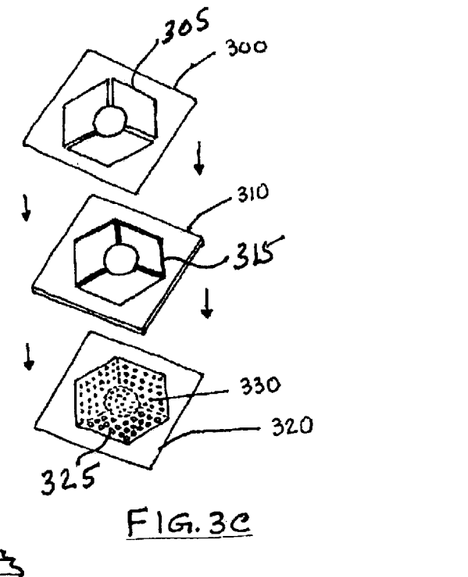
FIG. 3C illustrates yet another embodiment of the present invention.

FIG. 3C illustrates yet another embodiment of the present invention. FIG. 3C shows an overlay 300 having a design 305, which is attached to a spacer layer 310, with or without an appropriate cutout for the light to pass to the desired areas, both of which are preferably attach to a flexible substrate 320, have at least one light emitting element 330. The spacer layer 310 may have an appropriate design 315 which may or may not complement design 305. Similarly, the flexible substrate 320 may have an appropriate design 325 which may or may not complement design 305. The design 325 may be made using a sequence of light emitting elements 330.

Figure 4A:
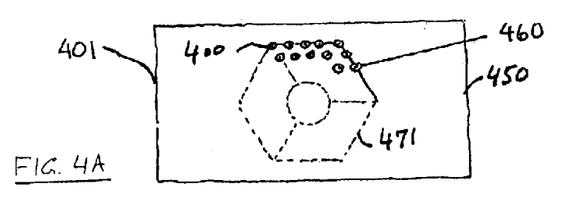
FIGS. 4A, 4B, 4C and 4D illustrate other embodiments of this invention.
Figure 4B:
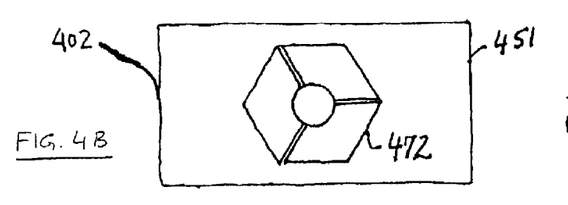
Figure 4C:
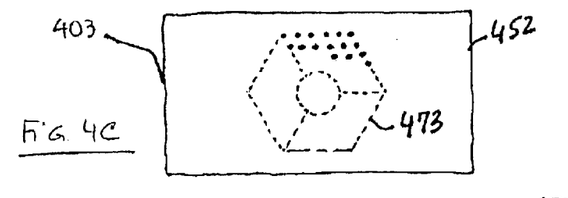
Figure 4D:
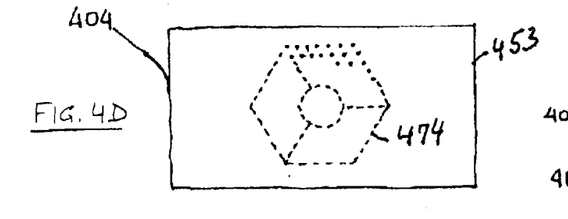

FIGS. 4A, 4B, 4C and 4D illustrate other embodiments of this invention. For the purposes of illustration the invention is shown as a "pad", however, other variations as discussed elsewhere in the specification are equally applicable here. FIG. 4A, for example, illustrates an embroidered type pad 450, having an overlay 401, to show or define a design or image or pattern 471. The overlay 401, preferably has a plurality of openings or holes 460 to expose the light emitting elements 400. FIG. 4B illustrates a pad 451 with a clear or colored transparent type overlay 402., to show or define a design or image or pattern 472. FIG. 4C illustrates a pad 452 with no overlay but using other means 403, to show or define a design or image or pattern 473, such as, for example, as shown with reference to FIG. 4H. FIG. 4D illustrates a pad 453 with no overlay but using other means 404, to show or define a design or image or pattern 474, such as, for example, as shown with reference to FIG. 4K.

Figure 4E:
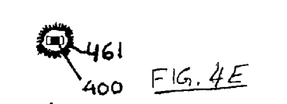
FIGS. 4E, 4F, 4G, 4H, 4J and 4K illustrate other embodiments of this invention with the light emitting elements.
Figure 4F:
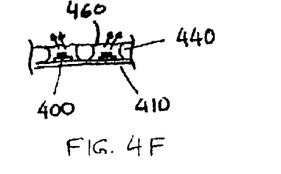
Figure 4G:
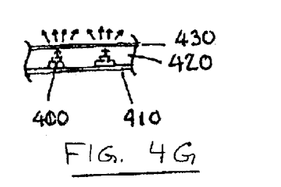
Figure 4H:
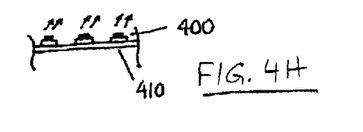
Figures 4J, 4K:
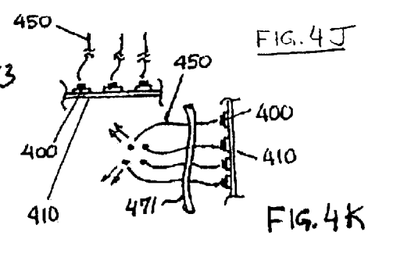

FIGS. 4E, 4F, 4G, 4H, 4J and 4K illustrate other embodiments of this invention with the light emitting elements 400. FIG. 4E shows a light emitting element 400 being exposed through an opening or hole or a see-through pattern 461. FIG. 4F illustrates a flexible circuit substrate 410, with a patch cross-section 440 showing the specially cut out holes or openings 460, that line up a corresponding light emitting elements 400. FIG. 4G illustrates a clear or colored transparent type overlay 430, with a spacer mask 420, with the light emitting elements 400, on the flexible substrate 410. FIG. 4H illustrates a flexible substrate or backing 410, having a plurality of light emitting elements 400 with no overlay. An example of such a structure would be a pad 403 or 404, that would display a pattern 473 or 474, mainly by the use of its light emitting elements 400 without the use of any overlay. FIG. 4J illustrates a flexible substrate or backing 410, having a plurality of light emitting elements 400 with no overlay, but with a plurality of light pipes 450. FIG. 4K illustrates a flexible substrate or backing 410, having a plurality of light emitting elements 400, and with a plurality of light pipes or optical fibers 450. It is preferred that the light emitting elements 400 is a LED 400, and it is also preferred that the light emitting elements 400, form an image or pattern by the use of light emitting elements 400 piping their lights to the point of use at the pattern or image. However, the light emitting elements 400 could be light pipes or optical fibers 450 that are used to form the image or pattern or design.

Figure 5A:
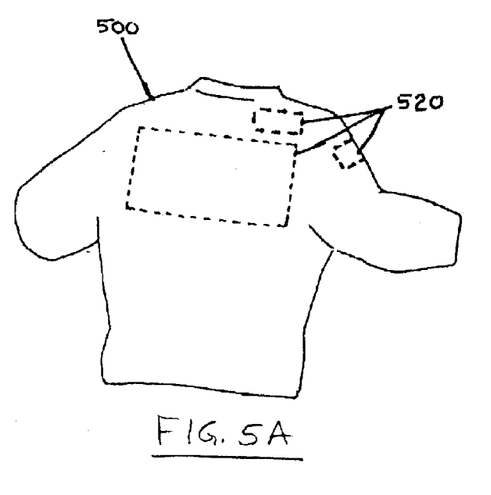
FIGS. 5A and 5B illustrate a wearable garment of this invention.
Figure 5B:
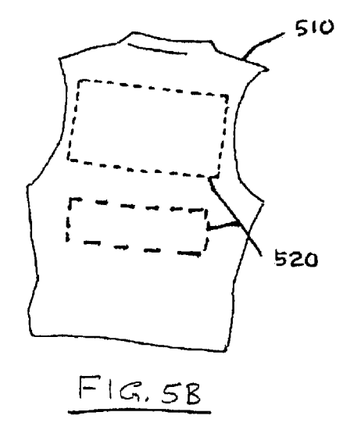

FIGS. 5A and 5B illustrate a wearable garment of this invention. FIG. 5A shows a wearable garment 500 having sleeves and a plurality of locations 520 to display or implement this invention. FIG. 5B shows a wearable garment 510 having no sleeves and a plurality of locations 520 to display or implement this invention. The flexible, wearable, illuminated pad subject of this invention can also be attached interchangeably to different compatible garments.

Figure 5C:
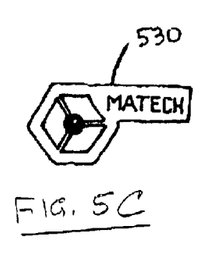
FIGS. 5C, 5D and 5E illustrate various indicators that can be used with this invention.
Figures 5D, 5E:
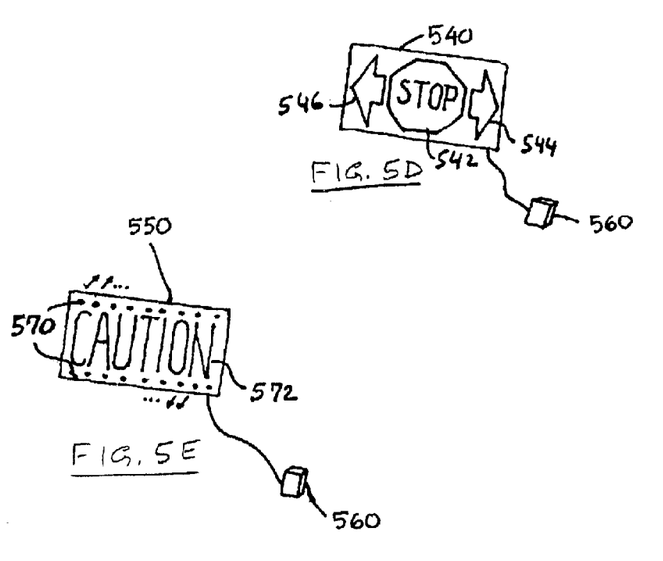

FIGS. 5C, 5D and 5E illustrate various indicators or pads that can be used with this invention. FIG. 5C shows a logo. FIG. 5D shows a plurality of indicators, such as, for example, a stop sign 542, a right arrow 544 and a left arrow 546. FIG. 5E shows a message 550, with at least one indicator 572, such as, for example, a caution sign 572, a plurality of added visibility features 570, such as, for example, florescent type indicators 570, or light emitting elements 570. At least one external controller and power supply 560 may also be provided where electrical power or light illumination may be required.

The indicators 530, 540 and 550 may be placed at any suitable location, such as, for example, location of display 520. The pads can also be of different shapes and may contain different illustrations or designs 530, 540 and 550. The pad may incorporate overlays and characteristics of different types, such as, clear or colored transparent overlay, with or without external controller and/or power supply, clear or colored transparent overlay 540 with external controller and power supply 560, and clear or colored transparent overlay with multiple rows lacking a patterned overlay for added visibility 550 with external controller and/or power supply 560.

Figure 6:
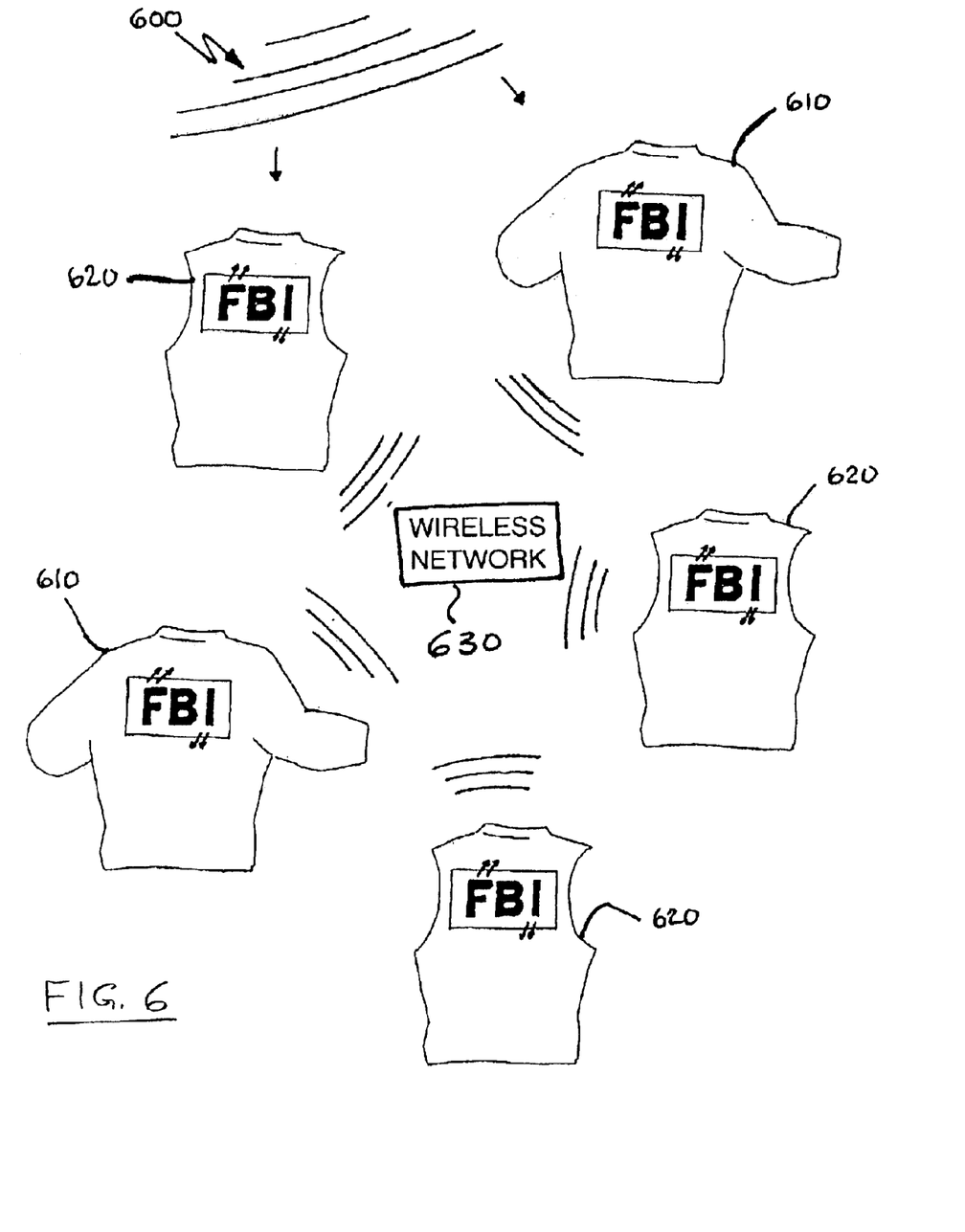
FIG. 6 illustrates a network of pad-equipped garments.

FIG. 6 illustrates a network of pad-equipped garments. Pad-equipped duty jacket 610 and pad-equipped duty vest 620 are electronically connected via a wireless network 630 and/or capable of receiving transmission signal 600, such as a GPS signal 600. In this embodiment of the invention the pads are equipped with positional awareness capabilities, for example, GPS, inertial, to name a few, and wireless networking capabilities, for example, via Blue Tooth and/or 802.11, to name a few. The pads can also broadcast a visible, RF, or infrared, among other medium, an ID or friend/foe indication.

The pattern would also be selectively visible. The selectivity enables elements of the pattern to be most visible when appropriate for the type of pattern. For example, in the case of a motorcycle rider, when the motorcycle turn signal is activated the "left arrow" pattern, patterns, or sequence of patterns associated with the "left turn" pattern, will be "turned on." Similarly, a "right turn" and "stop" pattern, patterns, or sequences of patterns can exist and can be turned on when the right turn signals, or breaks, respectively, are activated.

The pattern may include the preceding, concurrent, subsequent, or otherwise related, in addition or instead of, or in any other possible combination, the activation of other forms of sensory stimulation or I/O. Included, but not limited to, are sound, vibration, mechanical, thermal, radio frequency (RF), or other forms of energy, in order to indicate the wearer or those in its environment, actions, situations, intents, or other information to the wearer or to its environment, including, but not limited to observers, equipment, sensors, or other devices or entities.

A simple circuit and power source 30 can power and sequence the LEDs or other switchable visible elements to light up or activate when appropriate and in a sequence if so is desired, such as to create a "moving image." In a preferred embodiment, a single or multiplicity of arrows can light up in sequence when the corresponding turn signal is activated. A similar arrangement is contemplated for the other arrow and stop pattern, or any other appropriate patterns. The circuit can provide power and sequencing logic, including, but not limited to, on/off times, on/off sequences, visual effects, delays, and other appropriate effects. In the preferred embodiment, the circuit is small and contained within the garment 10, alternatively, it can also be external to it and attached to the garment by a variety of possible means, including, but not limited to, a wire harness, a combination or wired and wireless links, among others. The power source can consist, but no be limited to, commercial batteries or similar devices. Furthermore, the driving circuitry may consist of, but is not be limited to, commercial display drivers, LED drivers, microprocessors, memory, encoders, decoders, and related and ancillary devices, to name a few.

The activation of the patterns or their means of interacting with the surroundings, other devices, or other users or the same, related, similar or compatible devices can be made via a wired or wireless link. In the example when the user is a motorcycle rider, the wireless transmitter can be interfaced to the vehicle's electrical and lights system 40a, or to the signal lights 40b directly, or combinations of these schemes.

The transmitter can also be activated and/or powered by the lights themselves. Activation can be either electrically or optically, among other means of activation. Alternatively, a separate switch or set of switches activated by the driver or rider is also contemplated. In the preferred embodiment, the link is wireless 50a, 50b and activates the appropriate patterns automatically when the appropriate signal or action is activated or received. The link can be contained in the same enclosure or circuit as the pattern driving hardware 30. Alternatively, it can also be external to it and attached to the garment and other hardware by a variety of possible means, including, but not limited to, a wire harness, a combination or wired and wireless links, among others. The transmitting end of the activation circuit is directly wired into the motorcycle's electrical system 40a. Alternatively, separate transmitters can be installed in each of the vehicle's signal lights, left turn, right turn, and breaks 40b, and made such as to issue a signal to the receiver in the garment to activate the appropriate pattern. In a preferred embodiment the signals are of radio frequency, but infrared, other electromagnetic types, or any other type is also contemplated. In other contemplated applications, the wireless link 40a, can be interfaced to a variety of other devices, sensors, vehicles, individuals, or other appropriate sources of activation input.

Appropriate software is preferably embedded in the driving and/or communicating portions and/or in any other appropriate component of the device or the hardware to facilitate or enable its appropriate operation. The software can include, but it is not limited to, instructions as to when and how to operate the pattern or patterns, its sequences, if any such apply, when and how to turn the hardware on/off or sequence it, when and how to make the hardware and software interact with the driver or rider, its environment, the vehicle, or any other device, user or compatible apparatus, to name a few.

Even though a description of the safety garment has been given in this application, however, many variants and combinations which are conceivable and are also subjects of this invention. These variants are also contemplated and made part of this invention concerning the functionality as well as the application for the garment. It is clear that although motorcycle riding is cited as an application, many more are conceivable. Such applications may include, but are not limited to, industrial equipment, heavy equipment, construction equipment, construction site personnel, airport personnel, security personnel, law enforcement personnel, military, electrical utility crews, to name a few.

Additionally, a large variety of Input/Output (I/O) options are also contemplated as part of the functionality of the device. For example, included are, but it are not limited to, sensors, position devices (e.g. GPS), gyroscopic sensors, inertial sensors, magnetic sensors, electric field sensors, radiation sensors, to name a few. Furthermore, interaction of the device with its user and the environment is also contemplated in a variety of forms. For example, included are, but are not limited to, danger awareness, positional awareness, and team awareness (whereas the wearer is "networked" with other wearer or wearers while the devices are allowed to communicate information amongst themselves and interact with the wearer, thus increasing his/her safety, awareness, and survivability), to name a few. Interaction with the wearers (i.e. sensing of wearers biological signals) is also contemplated via a conductive or appropriately engineered inside interface areas or "patches." The interface or patches can connect via a variety of methods with the outer, intermediate or another layer, of the device, or with other devices directly, and take advantage of all functions that may be available.

Even though a large number of possible applications are conceivable, the invention provides a substantial improvement over the known art, especially in providing for a safety riding garment, industrial safety garment or device, military or law enforcement communication, networking, warning, protective, friend-or-foe indicator, airport operator garment, general purpose safety garment, to name a few.

The invention may also be used advantageously to indicate the wearer's intentions by visual, acoustical, or any other suitable means. It provides the wearer with an unobtrusive interface to a "team network" by means of which the "team" is aware via appropriate signals of the presence and location of his teammates. Furthermore, the invention provides the wearer and other users of the system with an efficient, unobtrusive, simple way of broadcasting or exchanging information.

The I/O that the garment or device is capable is not limited to, but may include: GPS, electrical, positional, inertial, gravitational, magnetic, radiation, temperature, light, conventional radio communications, other radio frequency or electromagnetic radiation based communications and networking, conventional networking of the above, to name a few. All such uses and applications are also subjects of this invention.

This invention can also be used advantageously to warn the wearer via the signals described elsewhere in the specification, of an impending peril. In particular, the high visibility garment can inform the wearer of the proximity of or to a vehicle, area or zone of danger, such as, for example, high voltage. The area can also be simply and flexibly designated by appropriately placed transponders broadcasting a signal marking the danger area.

Furthermore, this invention allows for law enforcement personnel or the military to provide the wearer an unobtrusive mean of indication of "team membership" or friend-or-foe status via a wireless networking, visual, RF or IR capabilities. Similarly, positional, health status (i.e. heart rate, temperature, skin conductivity, alive/dead, among others), and navigational awareness can be incorporated by the inclusion of, for example, biological signs, inertial sensors, GPS receivers, to name a few.

This invention will provide highly visible indication of the officer or soldier status, which can be turned off if the situation calls for. Situations like this arise in urban or raid situations common in law enforcement. Also, the increased visibility can be advantageously used for training purposes. The visible indicators can also be made to emit in the infrared (IR) if such is called for. In an embodiment, garments or devices belonging to the same "team" can broadcast a given number of "friend" signals.

This invention, whether garment or device can also be used to serve the handicapped. This can be done by making the user more visible, by making him/her aware of certain types of danger by virtue of its sensors and multiple forms of possible I/O, and by making unobtrusive forms of two way communication possible, the garment or device can be of substantial assistance.

Alternative embodiments of the present invention can perform a marketing function, such as, when highly visible signaling and interaction are coupled with corporate logos or messages. This could even include, for example, advertisement, location based marketing, to name a few. Such uses are also contemplated as subject of this invention. Furthermore, the garment or the device can also be used for fashion or cosmetic purposes. The high visibility and flexible display capability also makes it suitable for displaying patterns or messages suitable for social situations. This application can also take advantage of the communication, sensing and networking capabilities of the garment. For example, one's status or intentions can be displayed in the dance floor in a social situation. Phone numbers and other data can be privately or publicly exchanged by using this device or garment.

Also, the garment can take many conceivable forms, such as a riders jacket, safety vest, a dress jacket, a sports jacket, a "patch" or "pad", or a removable "patch" or "pad", that can be interchanged among a series of compatible garments. Furthermore, the device or "patch" can also be made to be worn as a stand-alone device. It is evident that the garment can take a great variety of forms and serve a great variety of purposes. All these variations and forms are also contemplated as subject of this invention.

Other applications resulting from the combinations, extensions, or adaptations of the invention are also contemplated as a subject of this invention.

Although many embodiments, variations and combinations are conceivable, and also subjects of this invention; some such relevant embodiments and variations are only mentioned in the specification for the purposes of illustration only and do not limit the scope of this invention.

This invention and its variants, and its alternative embodiments, independently of its applications or tasks it may be applied to or used in conjunction with any manmade product. This invention can be used by a rider during riding a motorcycle. This invention can be used by a person during riding an industrial vehicle, such as, a forklift, during riding heavy equipment. This invention can be used by personnel in an industrial setting. This invention can be used by personnel in a construction setting. This invention can be used by personnel in a setting where heavy equipment is being operated. This invention can be used by personnel in a setting where risk to humans is present. This invention can be used by personnel in a setting or environment where its use is appropriate. This invention can be used for law enforcement activities. This invention can be used for military activities. This invention can be used to perform any tasks, or in any other settings or applications in addition to those mentioned elsewhere in the specification. This invention can be used in any other configurations, in addition to those being mentioned elsewhere in the specification. This invention can be used as a communication device or a component thereof This invention can be implemented along with any other form of energy source, in addition to those being mentioned in the text above. This invention can be implemented to output other forms of visual, acoustic, or any other form of energy. This invention can be implemented to take as input any form of visual, acoustic, or other forms of energy. This invention can be used inverted, rotated or mirrored about any of its axis. This invention can be used when it is not a garment, but an add-on to one. This invention can be used when it is not a garment but attached to one. This invention can be modified to embody different arrangements, variations, or geometries of its layout, patterns, or dimensions. This invention can be used using different combinations of components or elements, such as different patterns, images, sounds, motion or combinations or permutations thereof. This invention can be used using components that display any form or shape in motion or stationary, including, but no limited to, rotation, translation, or oscillation of its components relative to each other or to an external frame of reference. This invention can be used using components that perform any function other than those described above, including, but no limited to, components or patterns that perform animation, visual effects, or other means of generating visual, acoustic or other forms of output. This invention can be used, or having any number of its components, in an inverted fashion (i.e. upside down). This invention can be used, or having any number of its components, at an angle from the horizontal. This invention can be used in a location or position not listed above. This invention can be used where the purpose of its use is merely decorative or cosmetic. This invention can be used in conjunction with a GPS device. This invention can be used with a variety of sensors. This invention can be used with temperature sensors. This invention can be used with inertial sensors. This invention can be used with light sensors. This invention can be used with ultrasonic sensors. This invention can be used with electromagnetic sensors. This invention can be used with electrical field sensors. This invention can be used with magnetic sensors. This invention can be used in conjunction with external transducers. This invention can be used in conjunction with radio sources or devices. This invention can be used with a combination of sensors and radio devices. This invention can be used with a combination of sensors, radio devices and signaling devices. This invention can be used with other sources of light for the pattern. This invention can be used with other types of driving electronics. This invention can be used with other types of activation hardware. This invention can be used with other types of communication or interfacing hardware.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A flexible pad comprising a plurality of indicators, wherein at least a first indicator is identical to at least a second indicator, and wherein a portion of said first indicator overlaps a portion of said second indicator, and wherein said first indicator and said second indicator have at least one means to illuminate them in a sequence in order to create a "moving" image.

2. The pad of claim 1, wherein the indicators are selected from a group consisting of an arrow indicator, a stop sign indicator, a caution type indicator, a logo indicator, and a design indicator.

3. The pad of claim 1, wherein the indicators are illuminated using means selected from a group consisting of LED, fiber optic and light pipe.

4. The pad of claim 1, wherein the indicators are positioned at a location selected from a group consisting of front, back and side of a wearable garment.

5. The pad of claim 1, wherein the indicators are illuminated using power from a module that is directly connected to said pad.

6. The pad of claim 1, having at least two layers, wherein said first layer is a flexible circuit substrate layer and said second layer is patch layer.

7. The pad of claim 1, wherein said pad has a plurality of layers, and wherein at least one layer is selected from a group consisting of a flexible substrate layer, an overlay layer, a separator layer, a transparent layer, a translucent layer, an opaque layer and high visibility-type layer.

8. The pad of claim 1, wherein said pad is secured to a garment selected from a group consisting of a vest, a jacket, a coat, an overcoat, a shirt, a skirt, a pant, an undergarment, an over-garment, a bag and a belt.

9. The pad of claim 1, wherein an interactive module is secured to said pad.

10. A high visibility garment, comprising, a plurality of indicators secured to said garment and wherein at least one indicator has at least one means to be electrically activated upon demand, and wherein at least a first indicator is identical to at least a second indicator, and wherein a portion of said first indicator overlaps a portion of said second indicator, and wherein said first indicator and said second indicator have at least one means to illuminate them in a sequence in order to create a "moving" image.

11. The high visibility garment of claim 10, wherein said garment has means for allowing communication with at least one other person wearing said garment.

12. The high visibility garment of claim 11, wherein said means for communication is selected from a group consisting of a wired means, a wireless means, a signal from a GPS, an RF transmission.

13. The high visibility garment of claim 10, further having a device comprising at least one high visibility indicator secured to said garment.

14. The pad of claim 1, wherein at least one of said indicator is secured by means selected from a group consisting of self-adhesive glue, glue, stitching means, buttons, peelable material, bonding material, epoxy-type material, magnet, magnet-type material and hook and loop.

15. The pad of claim 1, wherein at least one of said indicator is selected from a group consisting of transparent, translucent and opaque material.

16. The pad of claim 1, wherein said pad has at least one means to monitor and/or transmit at least one indication selected from a group consisting of wearers biological signals, wearers positional status, wearers health status, wearers navigational awareness, wearers identification indication and wearers friend/foe indication.

17. The high visibility garment of claim 10, wherein at least one of said indicator is secured to said garment by means selected from a group consisting of self-adhesive glue, glue, stitching means, buttons, peelable malarial, bonding material, epoxy-type material, magnet, magnet-type material and hook and loop.

18. The high visibility garment of claim 10, wherein at least one of said indicator is selected from a group consisting of transparent, translucent and opaque material.

19. The high visibility garment of claim 10, wherein said garment has at least one means to monitor and/or transmit at least one indication selected from a group consisting of wearers biological signals, wearers positional status, wearers health status, wearers navigational awareness, wearers identification indication and wearers friend/foe indication.

* * * * *